Jan. 20, 1942.　　　A. Y. DODGE　　　2,270,515
TRANSMISSION
Filed July 14, 1941
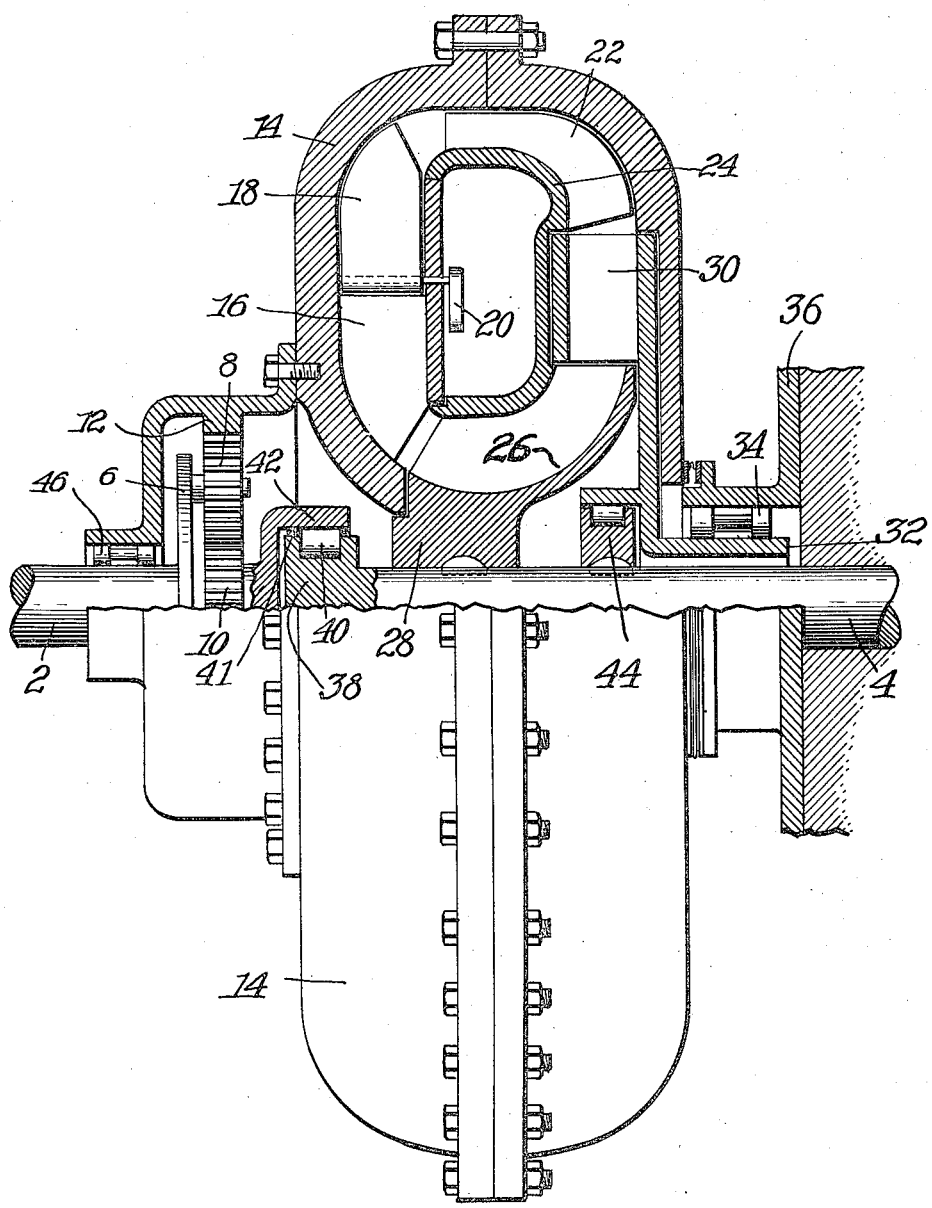
Inventor:
Adiel Y. Dodge,
By Dawson, Ooms & Booth,
Att'ys Patented Jan. 20, 1942

2,270,515

UNITED STATES PATENT OFFICE 2,270,515

TRANSMISSION

Adiel Y. Dodge, Rockford, Ill.

Application July 14, 1941, Serial No. 402,309

6 Claims. (Cl. 74—189.5)

This invention relates to transmissions, and more particularly to hydraulic transmissions of a type adapted for automotive use.

Transmissions have heretofore been provided in which input torque is divided by a set of differential gears into two paths, with a hydraulic torque transmitting device in one path; however, by test, such devices have proved completely incapable of approaching speed ratios of one-to-one when transmitting even a small load, and further than this, these previous devices provided a relatively low overall torque increase since this gear arrangement fails to increase that torque which passes through the gears.

One of the objects of the present invention is to provide a transmission of the type referred to in which a high degree of efficiency is provided throughout the operating range, from maximum torque multiplication to speed ratios approaching one-to-one, through a fluid drive, without resorting to a mechanical drive.

Another object of the invention is to provide a transmission of the type referred to in which increased torque multiplication is obtained at starting and at low speeds. According to one feature of the invention, the change from high torque condition to normal operating condition may be made automatically in response to output speed.

The above and other objects, advantages and novel features of the invention will be apparent from the following description, when read in connection with the accompanying drawing, in which the single figure is a side elevation of a transmission embodying the invention, with parts in axial section.

The transmission illustrated is adapted to connect a driving shaft 2 to a driven shaft 4, and comprises a planetary gear set including a gear carrier 6 connected to the driving shaft and carrying planet gears 8 meshing with a sun gear 10 and a ring gear 12. The ring gear is connected to a housing 14 of a hydraulic torque converter, the housing carrying a series of fixed inlet vanes 16 and a series of outlet vanes 18 pivoted adjacent their inlet ends. The outlet vanes are adapted to pivot under the influence of liquid reaction thereon, and of centrifugal weights 20 connected to the vanes and urging them to a forward angle in response to the centrifugal force.

A set of rotor vanes 22 are arranged adjacent the outlet end of the impeller vanes and are connected through a core 24 to a second set of rotor vanes 26 adjacent the inlet ends of the impeller vanes. The vanes 26 are supported on a hub 28, which is keyed to the driven shaft 4.

Between the two sets of rotor vanes, there is arranged a set of stator vanes 30, carried by a hub 32. A one-way brake 34 acts between the hub 32 and a fixed sleeve 36 to hold the stator vanes against reverse rotation, but to permit free forward rotation thereof. The torque converter described above may be of the type more particularly disclosed and claimed in my prior patents, Nos. 2,233,002 or 2,190,830.

It will be noted that this combined torque converter and fluid coupling includes impeller vanes extending throughout substantially the full radial length of the toroidal circuit provided by the several vaned elements, and that the rotor element is of substantially the same external diameter as the impeller. Furthermore, the flow passage area through the impeller is preferably greater than that through the other elements, and is diverging from its inlet to a point adjacent its outlet, the flow passages through the other elements gradually converging as explained in my Patent No. 2,233,002. With this construction, the torque converter apparatus operates at high efficiency throughout its entire range, from maximum torque multiplication to ratios approaching one-to-one, and during the latter ranges becoming effective as a fluid clutch to transmit substantially unitary torque with a small degree of slip.

The driven shaft 4 is adapted to be connected to the sun gear 10 by a clutch mechanism 38, operable in response to the speed of the driven shaft. This clutch mechanism may be of the type more particularly disclosed and claimed in my co-pending application, Serial No. 326,837, filed March 30, 1940, and includes a central block portion connected to the driven shaft and carrying pivotally mounted pawls 40 normally urged inwardly by springs, and movable outwardly into engagement with a sleeve 42 connected to the sun gear 10 by centrifugal force. A balking ring 41 may be provided to hold the pawls 40 in inoperative position, except upon a reversal of torque, as explained in application, Serial No. 326,837. When the clutch mechanism is engaged to connect sun gear 10 to the driven shaft, the torque input of the driving shaft is divided in the gearing, a portion thereof passing directly to the driven shaft through the sun gear and clutch mechanism, and another portion thereof passing through the hydraulic torque converter to the driven shaft. It will be noted that since the sun gear 10 is substantially smaller than the ring gear 12, a larger portion of the torque will flow through the torque converter than directly to the driven shaft. This construction has another important advantage in that it reduces the amount of torque demultiplication between the driving shaft and the hydraulic torque converter. Thus, the overall torque increase between the driving shaft 2 and the driven shaft 4 is much greater than it would be if the gears 10 and 12 were of the same or approximately the same size, so that a higher torque increase is obtained at low speeds, even though the clutch 38 is engaged and the power is flowing through two paths.

As the speed of the impeller 14 and the rotor approaches one-to-one, the entire mechanism tends to rotate as a unit with the sun gear 10 and the ring gear 12 turning near the same speed. Under these conditions, the stator 30 tends to overrun the brake 34, due to the impact of fluid striking the backs of the stator vanes and under these conditions the efficiency of the unit as a hydraulic clutch may be increased by connecting the stator to the driven shaft to form, in effect, a continuation of the rotor. For this purpose a speed responsive clutch mechanism 44 may be provided, acting between the driven shaft and the stator to prevent the stator from overrunning the driven shaft in the forward direction. The clutch 44 may be of the same general type as clutch 38, and is engaged in response to the speed of the driven shaft.

In order to provide a further torque increase for starting and at low speeds, provisions may be made for connecting the impeller housing 14 directly to the driving shaft under low speed operating conditions. For this purpose, a one-way clutch 46 may be provided, acting between the driving shaft and an extension of the ring gear 12 to prevent the driving shaft from turning forward faster than the ring gear, and allowing the ring gear to overrun the driving shaft. When this clutch mechanism is provided and with the clutch 38 disengaged, the drive will be from the driving shaft through clutch 46 to the impeller housing 14 and through the rotor mechanism to the driven shaft. At this time, the full torque increase of the hydraulic unit is available so that the driven shaft will be turned forwardly at a high torque solely through the hydraulic torque converter. As the speed of the driven shaft increases the clutch 38 may be engaged to connect the sun gear 10 to the driven shaft. This engagement may be made by momentarily reversing the torque, as fully described in my co-pending application, Serial No. 326,837. At this time, the ring gear 12 and the impeller housing 14 will tend to turn faster than the driving shaft, so that the clutch 46 will overrun. This condition continues to a degree even after the torque converter reaches a ratio near one-to-one, at which time the impeller turns a little faster than the rotor, and the transmission will turn substantially as a unit.

When desired, a one-way clutch may be used between parts 42 and 38 in addion to the clutch pawls 40, as shown in my co-pending application, Serial No. 326,837, to prevent free wheeling.

While one embodiment of the invention has been shown and described in detail, it will be understood that this is illustrative only, and is not intended as a definition of the scope of the invention, reference being had for this purpose to the appended claims.

What is claimed is:

1. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, a one-way clutch connecting the driving shaft to the impeller to drive the impeller forward and clutch means connecting a third element of the gear set to the driven shaft, said one-way clutch overrunning when the last named clutch means is engaged.

2. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, a one-way clutch connecting the driving shaft to the impeller to drive the impeller forward, and clutch means responsive to the speed of the driven shaft for connecting a third element of the gear set to the driven shaft.

3. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, a one-way clutch connecting the driving shaft to the impeller to drive the impeller forward, clutch means responsive to the speed of the driven shaft for connecting a third element of the gear set to the driven shaft, and clutch means operable above a predetermined speed of the driven shaft to prevent the stator from turning faster than the driven shaft.

4. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, clutch means to prevent the stator from turning forward faster than the driven shaft, and clutch means to connect a third element of the gear set to the driven shaft.

5. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, clutch means operable in response to the speed of the driven shaft to connect the stator thereto above a predetermined speed thereof, and clutch means to connect a third element of the gear set to the driven shaft.

6. A transmission for connecting a driving shaft to a driven shaft comprising a planetary differential gear set, a hydraulic torque converter including a vaned impeller, a vaned rotor and a vaned stator forming a toroidal liquid circuit, means connecting said rotor to the driven shaft, means connecting one element of the gear set to the driving shaft, means connecting another element of the gear set to the impeller, a one-way brake to hold the stator against reverse rotation, clutch means operable in response to the speed of the driven shaft to connect the stator thereto above a predetermined speed, and a second clutch means operable in response to the speed of the driven shaft to connect a third element of the gear set thereto above a predetermined speed.

ADIEL Y. DODGE.